United States Patent
Rafey

(10) Patent No.: US 11,436,412 B2
(45) Date of Patent: Sep. 6, 2022

(54) PREDICTIVE EVENT SEARCHING UTILIZING A MACHINE LEARNING MODEL TRAINED USING DYNAMICALLY-GENERATED EVENT TAGS

(71) Applicant: EMC IP Holding Company LLC, Hopkinton, MA (US)

(72) Inventor: Mohammad Rafey, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 415 days.

(21) Appl. No.: 16/793,611

(22) Filed: Feb. 18, 2020

(65) Prior Publication Data

US 2021/0256209 A1    Aug. 19, 2021

(51) Int. Cl.

| | |
|---|---|
| *G06F 40/20* | (2020.01) |
| *G06F 40/284* | (2020.01) |
| *G06N 20/00* | (2019.01) |
| *G06F 9/54* | (2006.01) |
| *G06F 40/295* | (2020.01) |
| *G06N 3/04* | (2006.01) |
| *G06F 40/30* | (2020.01) |
| *G06F 40/279* | (2020.01) |
| *G06F 40/117* | (2020.01) |
| *G06F 40/194* | (2020.01) |
| *G10L 15/16* | (2006.01) |

(Continued)

(52) U.S. Cl.
CPC ............ *G06F 40/284* (2020.01); *G06F 9/542* (2013.01); *G06F 40/279* (2020.01); *G06F 40/295* (2020.01); *G06F 40/30* (2020.01); *G06N 3/04* (2013.01); *G06N 20/00* (2019.01); *G06F 16/953* (2019.01); *G06F 40/117* (2020.01); *G06F 40/194* (2020.01); *G06F 40/211* (2020.01); *G10L 15/16* (2013.01)

(58) Field of Classification Search
None
See application file for complete search history.

(56) References Cited

U.S. PATENT DOCUMENTS

| | | | |
|---|---|---|---|
| 7,865,546 B1 * | 1/2011 | Tuzhilin | H04L 12/6418 709/202 |
| 7,882,087 B2 * | 2/2011 | Johnson | G06F 16/2393 707/700 |
| 10,503,792 B1 * | 12/2019 | Frieder | G06F 12/0871 |

(Continued)

*Primary Examiner* — Richard Z Zhu
(74) *Attorney, Agent, or Firm* — Ryan, Mason & Lewis, LLP

(57) ABSTRACT

An apparatus includes at least one processing device configured to obtain event metadata for events published by event sources to an event platform, the event metadata comprising static event tags for respective ones of the events. The at least one processing device is also configured to generate dynamic event tags having an association with event types based at least in part on analysis of real-time event traffic comprising a subset of the events published by the event sources to the event platform over a designated time period. The at least one processing device is further configured to train a machine learning model utilizing the static event tags and the association of the dynamic event tags with the event types, receive a query comprising event parameters, and provide a response to the query by utilizing the trained machine learning model to match events with the event parameters in the query.

20 Claims, 8 Drawing Sheets

(51) Int. Cl.
*G06F 40/211* (2020.01)
*G06F 16/953* (2019.01)

(56) References Cited

U.S. PATENT DOCUMENTS

| | | | |
|---|---|---|---|
| 11,151,167 B2* | 10/2021 | Frieder | G06F 16/9574 |
| 11,200,264 B2* | 12/2021 | Robert Jose | G06F 16/9535 |
| 2012/0117484 A1* | 5/2012 | Convertino | G06Q 50/01 |
| | | | 715/744 |
| 2014/0372102 A1* | 12/2014 | Hagege | G06F 40/295 |
| | | | 704/9 |
| 2017/0124487 A1 | 5/2017 | Szeto et al. | |
| 2017/0286857 A1 | 10/2017 | Gaon et al. | |
| 2019/0074987 A1* | 3/2019 | Wiener | H04L 12/1831 |
| 2019/0171977 A1 | 6/2019 | Kurian et al. | |
| 2019/0318730 A1* | 10/2019 | Hazarika | G06Q 10/067 |
| 2019/0332961 A1 | 10/2019 | Rose et al. | |
| 2019/0347668 A1 | 11/2019 | Williams et al. | |
| 2021/0256221 A1* | 8/2021 | Beaugh | G06N 3/0472 |

\* cited by examiner

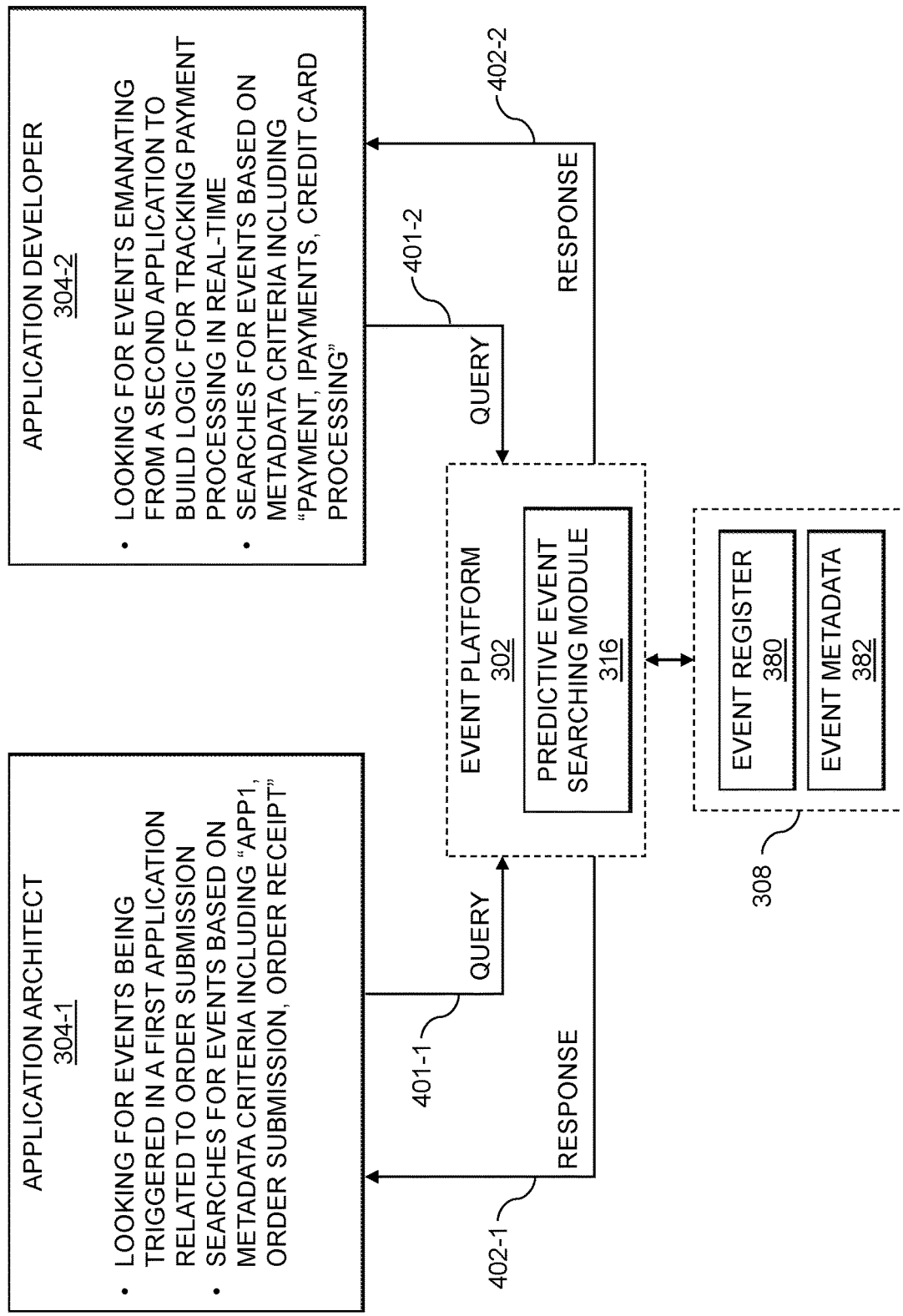

US 11,436,412 B2

1

PREDICTIVE EVENT SEARCHING UTILIZING A MACHINE LEARNING MODEL TRAINED USING DYNAMICALLY-GENERATED EVENT TAGS

FIELD

The field relates generally to information processing, and more particularly to techniques for event management utilizing machine learning.

BACKGROUND

Event platform systems provide functionality for processing of events originating at a set of event sources and sent to a set of event targets. The event sources and targets may include applications in a distributed computing platform, such as a cloud computing platform. The event platform may utilize a publish-subscribe model, where the event sources act as publishers and manually categorize events into a set of classes, and where the event targets act as subscribers for different ones of the set of classes. Event platform systems may implement an event register that catalogs the events, where the event register is searchable by a set of computing devices.

SUMMARY

Illustrative embodiments of the present disclosure provide techniques for event searching utilizing a machine learning model trained using dynamically-generated event tags.

In one embodiment, an apparatus comprises at least one processing device comprising a processor coupled to a memory. The at least one processing device is configured to perform the step of obtaining event metadata for a plurality of events published by one or more event sources to an event platform, the event metadata comprising static event tags for respective ones of the plurality of events. The at least one processing device is also configured to perform the step of generating one or more dynamic event tags having an association with one or more event types based at least in part on analysis of real-time event traffic, the real-time event traffic comprising a subset of the plurality of events published by the one or more event sources to the event platform over a designated time period. The at least one processing device is further configured to perform the steps of training a machine learning model utilizing the static event tags for respective ones of the plurality of events and the association of the one or more dynamic event tags with the one or more event types, receiving a query comprising one or more event parameters, and providing a response to the query by utilizing the trained machine learning model to match one or more of the plurality of events with the one or more event parameters in the query.

These and other illustrative embodiments include, without limitation, methods, apparatus, networks, systems and processor-readable storage media.

2

Figure 3A:
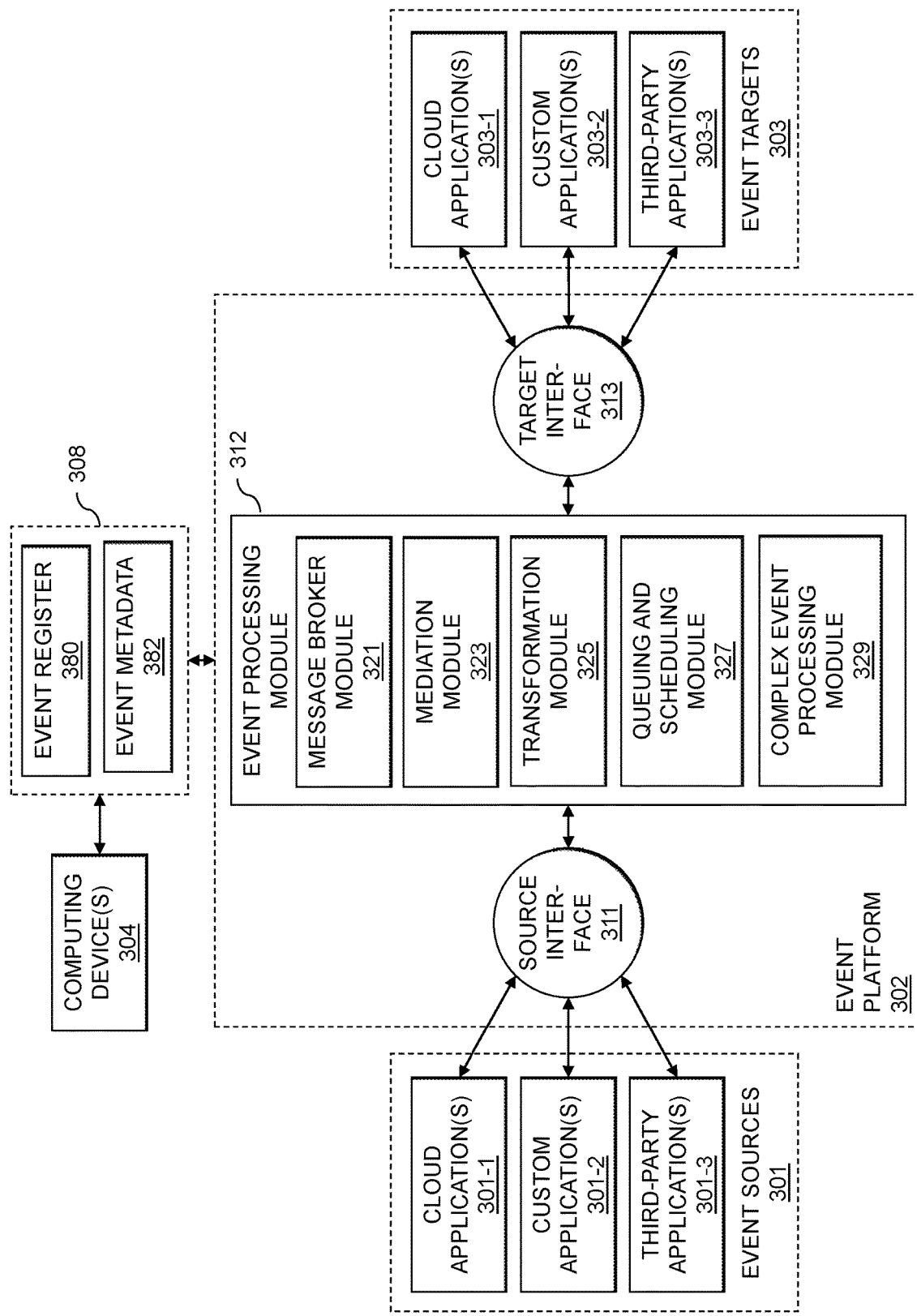
Figure 3B:
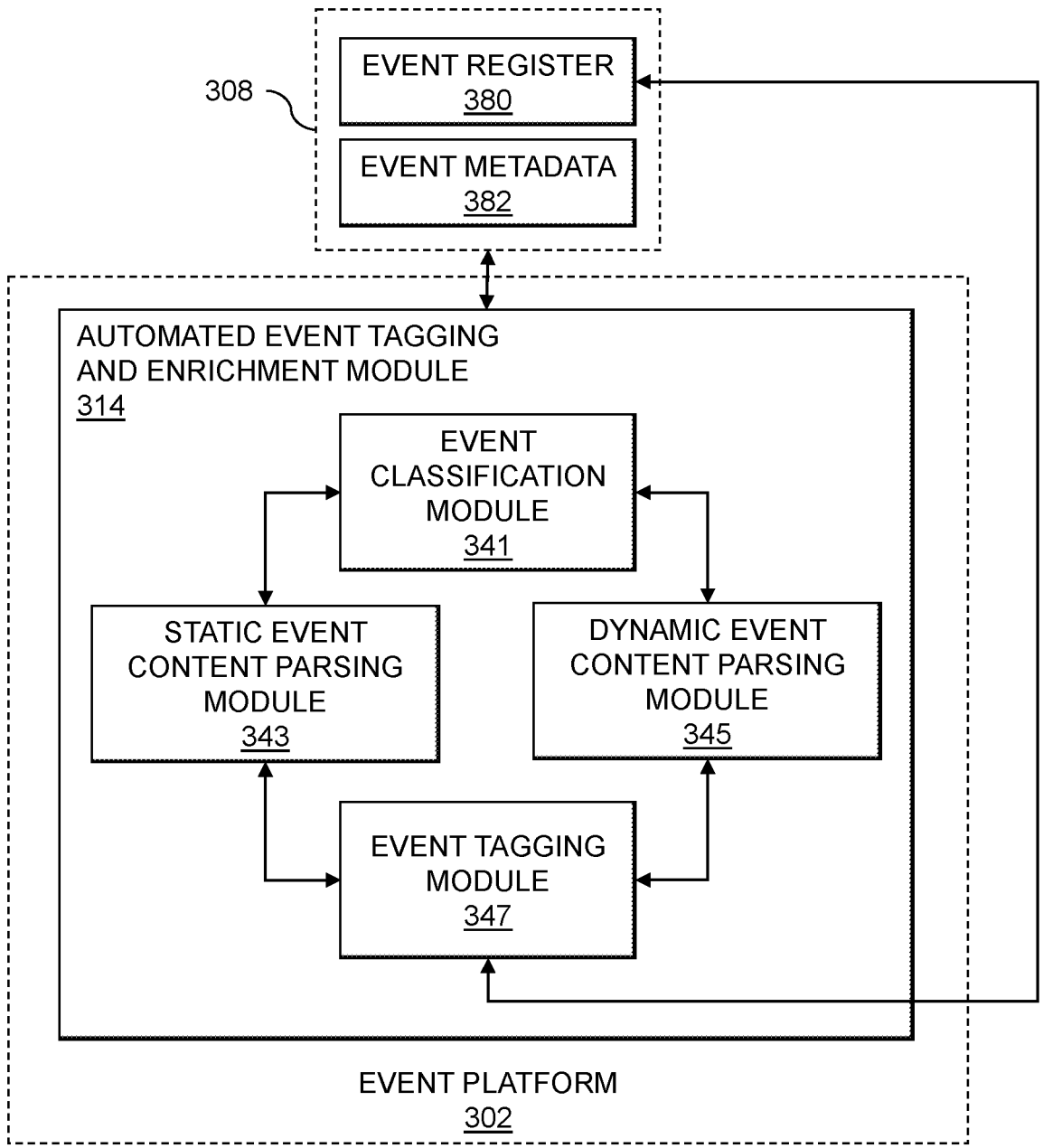
Figure 3C:
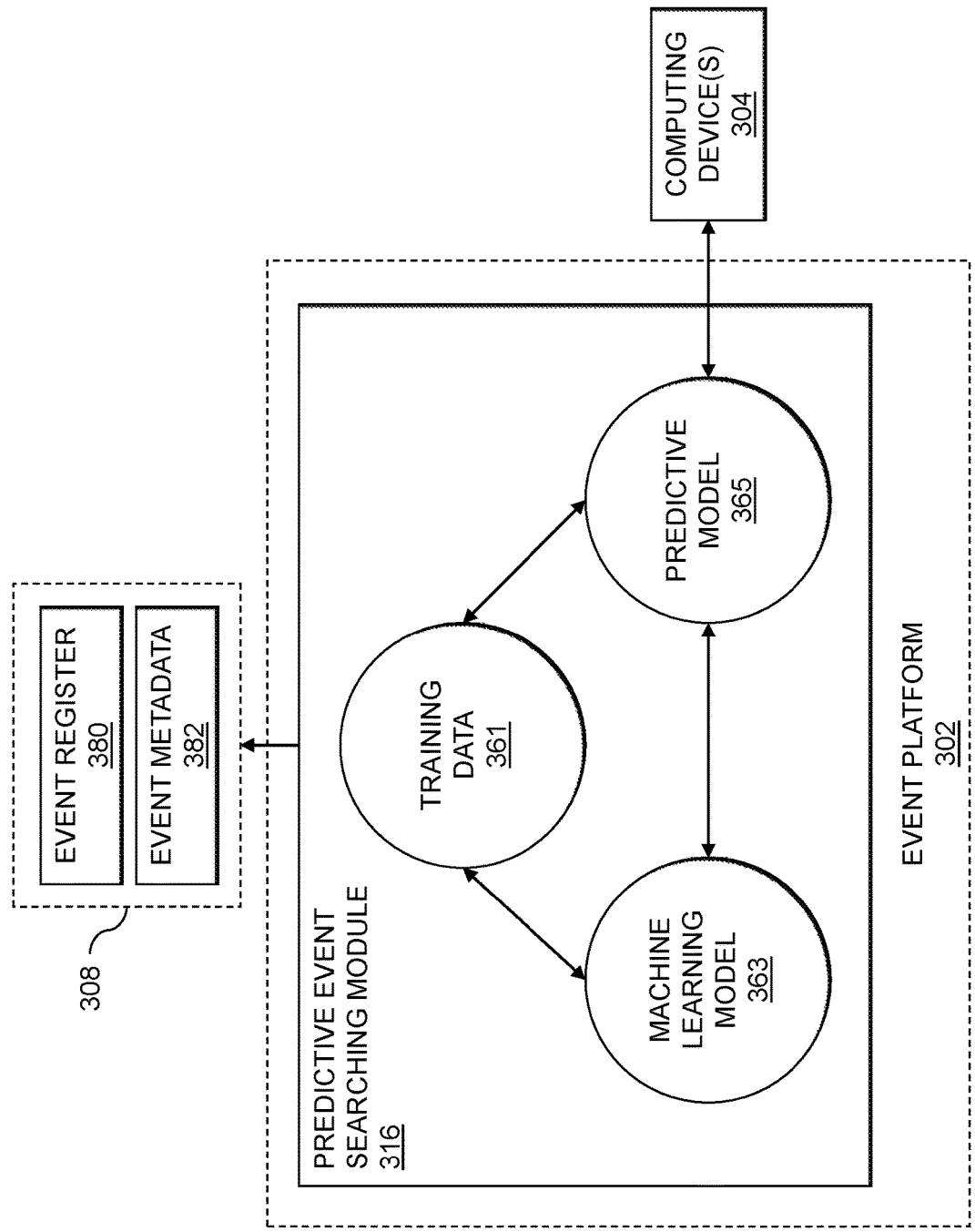

FIGS. 3A through 3C show a system for predictive application event metadata enrichment in an illustrative embodiment.

FIG. 4 illustrates operation of the system of FIGS. 3A-3C in an illustrative embodiment.

Figure 5:
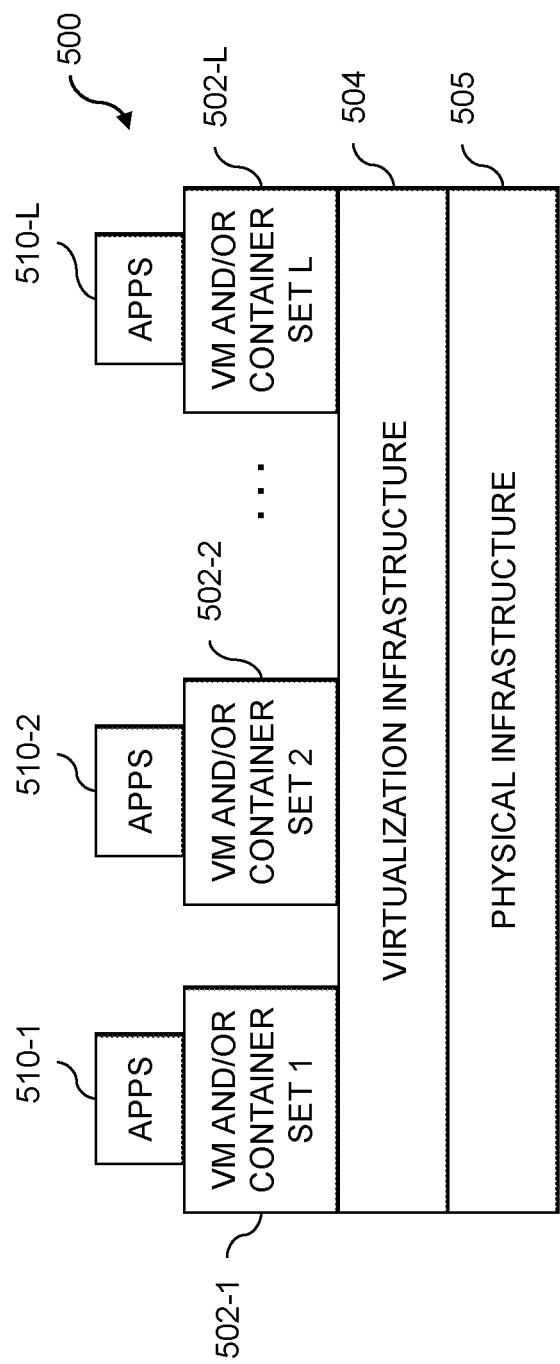
Figure 6:
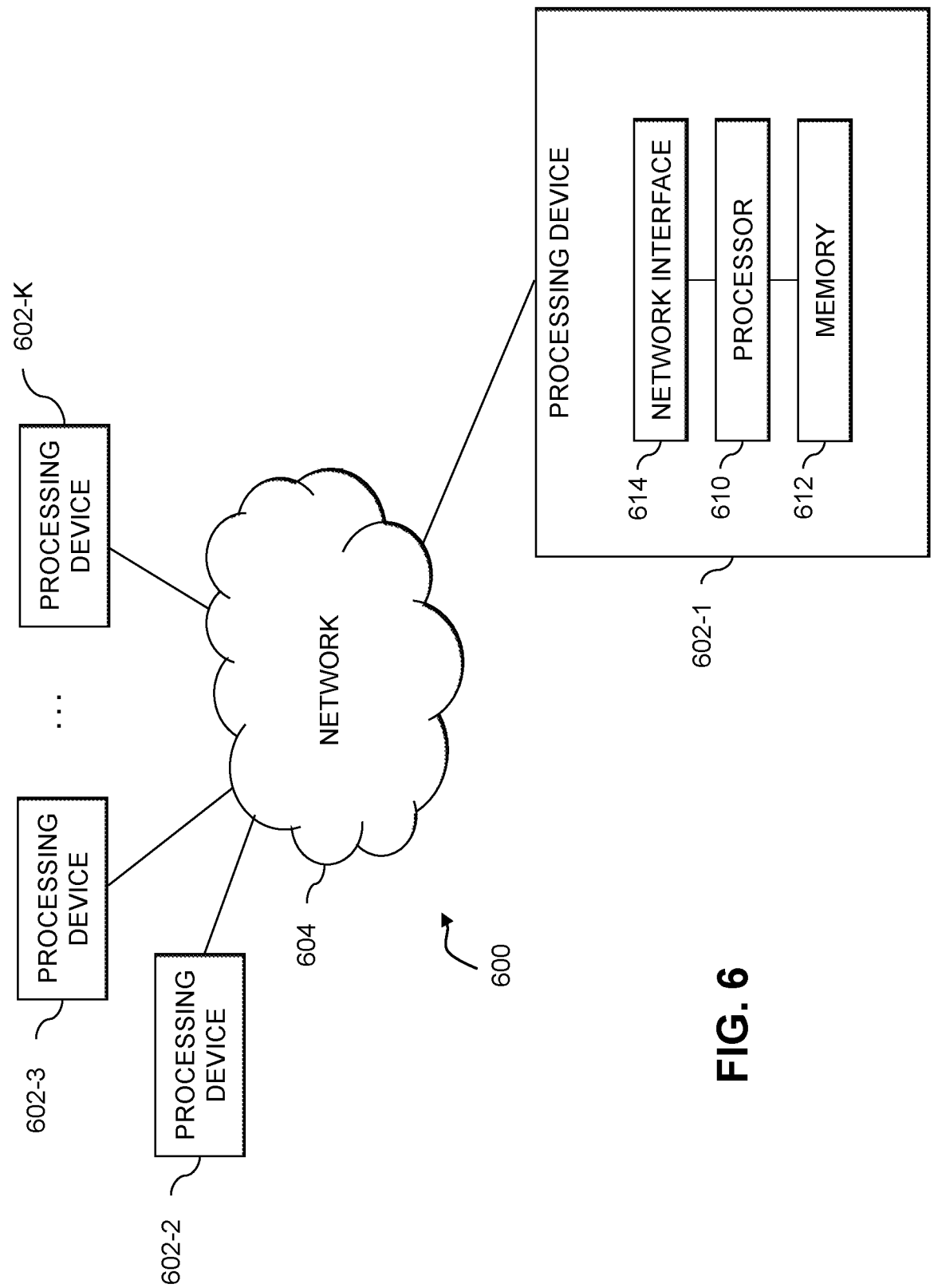

FIGS. 5 and 6 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
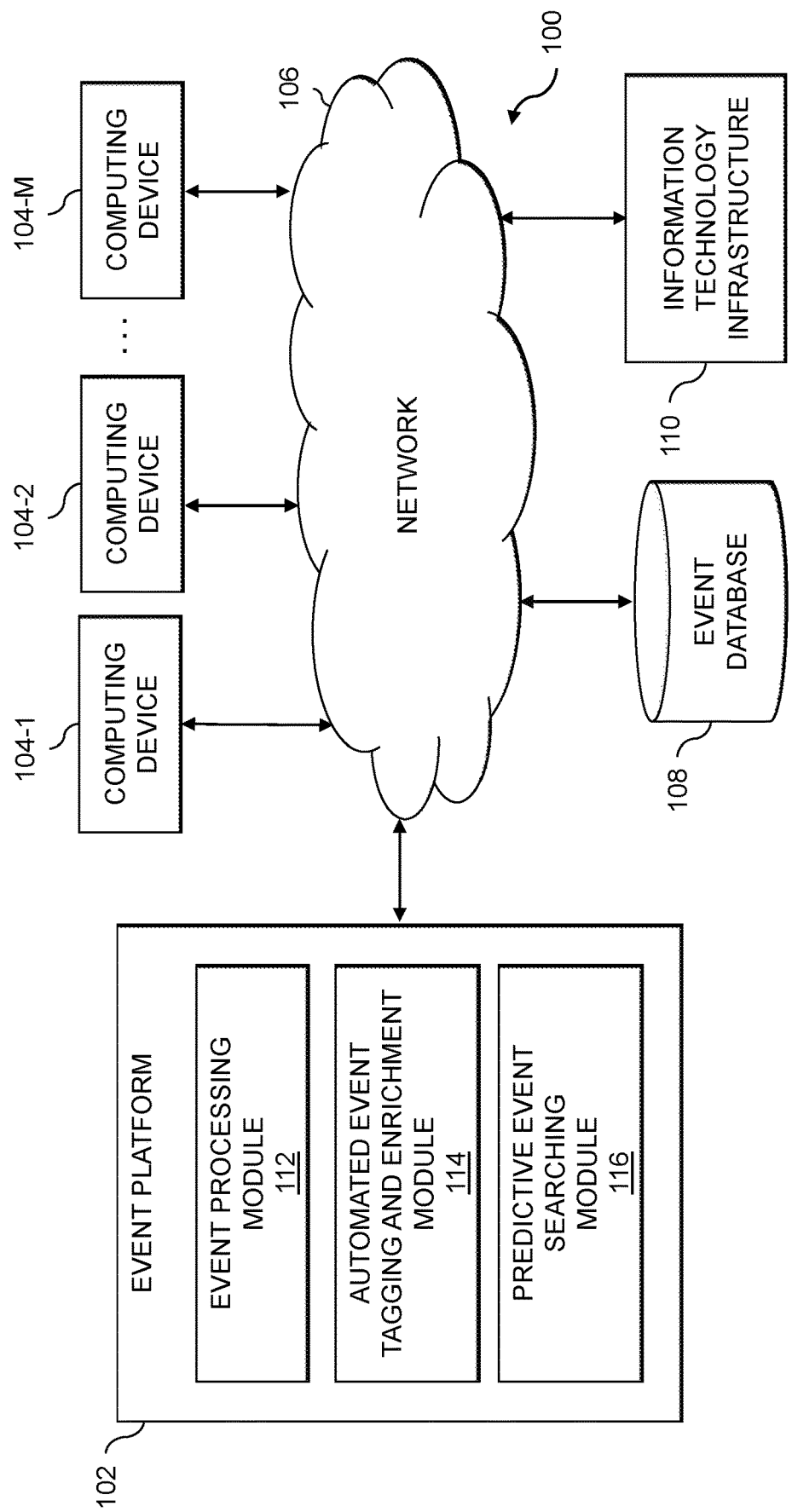
FIG. 1 is a block diagram of an information processing system for event searching utilizing a machine learning model trained using dynamically-generated event tags in an illustrative embodiment.

FIG. 1 shows an information processing system 100 configured in accordance with an illustrative embodiment. The information processing system 100 is assumed to be built on at least one processing platform and provides functionality for event searching utilizing a machine learning model trained using dynamically-generated event tags. The system 100 includes an event platform 102 that allows computing devices 104-1, 104-2, . . . 104-M (collectively, computing devices 104) to query or search for events. The event platform 102 and computing devices 104 are coupled to a network 106. Also coupled to the network 106 is an event database 108, which may store various information relating to events from event sources and targets in an information technology (IT) infrastructure 110. The event sources and targets may comprise or be associated with various assets in the IT infrastructure 110, such as physical and virtual computing resources of the IT infrastructure 110. Physical computing resources include, but are not limited to, servers, network equipment, storage systems, Internet of Things (IoT) devices, etc. Virtual computing resources include, but are not limited to, virtual machines (VMs) and software containers. In some embodiments, the event sources and targets comprise various applications that run on the physical and virtual computing resources of the IT infrastructure 110.

The computing devices 104 may comprise, for example, physical computing devices such as IoT devices, mobile telephones, laptop computers, tablet computers, desktop computers or other types of devices, in any combination. Such devices are examples of what are more generally referred to herein as "processing devices." Some of these processing devices are also generally referred to herein as "computers." The computing devices 104 may also or alternately comprise virtualized computing resources, such as VMs, containers, etc.

The computing devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The event database 108, as discussed above, is configured to store and record information relating to events from event sources and targets in the IT infrastructure 110, such as in the form of an event register and associated event metadata as will be described in further detail below.

The event database 108 in some embodiments is implemented using one or more storage systems or devices associated with the event platform 102. In some embodiments, one or more of the storage systems utilized to implement the event database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the event platform 102, the computing devices 104, the event database 108, and the IT infrastructure 110, as well as to support communication between the event platform 102, the computing devices 104, the event database 108, the IT infrastructure 110 and other related systems and devices not explicitly shown.

Although shown as a separate element in this embodiment, the event platform 102 in other embodiments can be implemented at least in part within one or more of the computing devices 104, or as part of another system coupled to the network 106 such as an application programming interface (API) marketplace search platform or system, or another broad-based search platform, as part of an event system that utilizes a publish-subscribe model, etc.

The event platform 102 in the FIG. 1 embodiment is assumed to be implemented using at least one processing device. Each such processing device generally comprises at least one processor and an associated memory, and implements one or more functional modules for controlling certain features of the event platform 102. In the FIG. 1 embodiment, the event platform 102 comprises an event processing module 112, an automated event tagging and enrichment module 114, and a predictive event searching module 116.

The event processing module 112 is configured to obtain event metadata for a plurality of events published by one or more event sources (e.g., assets of the IT infrastructure 110, such as physical and virtual computing resources or applications running thereon) to the event platform 102. The event metadata comprises static event tags for respective ones of the plurality of events. The static event tags may be assigned (e.g., by the event source) in conjunction with publishing the events to the event platform 102. The event metadata may include various other information or event contents, including payload schema, data, application source, and other fields.

The automated event tagging and enrichment module 114 is configured to generate one or more dynamic event tags associated with one or more event types based at least in part on analysis of real-time event traffic. The real-time event traffic comprises a subset of the plurality of events published by the one or more event sources to the event platform over a designated time period (e.g., in the past day, the past 12 hours, etc.). The automated event tagging and enrichment module 114 is also configured to train a machine learning model (e.g., a convolutional neural network (CNN) model) utilizing the static event tags for respective ones of the plurality of events and the association of the one or more dynamic event tags with the one or more event types.

The predictive event searching module 116 is configured to receive queries comprising one or more event parameters, and to provide responses to the queries by utilizing the trained machine learning model to match one or more of the plurality of events with the one or more event parameters in the queries.

In some embodiments, the computing devices 104 may implement host agents that are configured for communication with the event platform 102. The host agents on the computing devices 104 may be configured to submit the queries or other searches to the event platform 102, and to receive corresponding query or search results from the event platform 102. The host agents on the computing devices 104 may be further configured to receive notifications from the event platform 102, such as in response to detection of specified types of events in accordance with subscription preferences of the computing devices 104. More generally, the host agents may provide APIs for communication between the event platform 102 and the computing devices 104.

It should be noted that a "host agent" as this term is generally used herein may comprise an automated entity, such as a software entity running on a processing device. Accordingly, a host agent need not be a human entity.

It is to be appreciated that the particular arrangement of the event platform 102, the event processing module 112, the automated event tagging and enrichment module 114, and the predictive event searching module 116 illustrated in the FIG. 1 embodiment is presented by way of example only, and alternative arrangements can be used in other embodiments. As discussed above, for example, the event platform 102, the event processing module 112, the automated event tagging and enrichment module 114, and the predictive event searching module 116 may in some embodiments be implemented internal to one or more of the computing devices 104. As another example, the functionality associated with the event processing module 112, the automated event tagging and enrichment module 114, and the predictive event searching module 116 may be combined into one module, or separated across more than three modules with the multiple modules possibly being implemented with multiple distinct processors or processing devices.

At least portions of the event processing module 112, the automated event tagging and enrichment module 114, and the predictive event searching module 116 may be implemented at least in part in the form of software that is stored in memory and executed by a processor.

It is to be understood that the particular set of elements shown in FIG. 1 for event searching utilizing a machine learning model trained using dynamically-generated event tags is presented by way of illustrative example only, and in other embodiments additional or alternative elements may be used. Thus, another embodiment may include additional or alternative systems, devices and other network entities, as well as different arrangements of modules and other components.

The event platform 102 and other portions of the system 100 may be part of cloud infrastructure as will be described in further detail below.

The event platform 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The computing devices 104 and event platform 102 or components thereof (e.g., the event processing module 112, the automated event tagging and enrichment module 114, and the predictive event searching module 116) may be implemented on respective distinct processing platforms, although numerous other arrangements are possible. For example, in some embodiments at least portions of the event platform 102 and one or more of the computing devices 104 are implemented on the same processing platform. A given computing device (e.g., 104-1) can therefore be implemented at least in part within at least one processing platform that implements at least a portion of the event platform 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the event platform 102, the computing devices 104, the event database 108 and the IT infrastructure 110, or portions or components thereof, to reside in different data centers. Numerous other distributed implementations are possible. The event platform 102 or portions thereof can also be implemented in a distributed manner across multiple data centers.

Additional examples of processing platforms utilized to implement the event platform 102 and other portions of the system 100 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for event searching utilizing a machine learning model trained using dynamically-generated event tags will now be described in more detail with reference to the flow diagram of FIG. 2. It is to be understood that this particular process is only an example, and that additional or alternative processes for event searching utilizing a machine learning model trained using dynamically-generated event tags may be used in other embodiments.

In this embodiment, the process includes steps 200 through 208. These steps are assumed to be performed by the event platform 102 utilizing the event processing module 112, the automated event tagging and enrichment module 114, and the predictive event searching module 116. The process begins with step 200, obtaining event metadata for a plurality of events published by one or more event sources to an event platform. The event metadata comprises static event tags for respective ones of the plurality of events. At least one of the static event tags for a given one of the plurality of events is assigned by a given one of the event sources in conjunction with publishing the given event to the event platform. The event metadata for a given one of the plurality of events may include, in addition to one or more static event tags, metadata such as a source application, an event name, an event description, a payload schema, a payload content type, etc.

In step 202, one or more dynamic event tags associated with one or more event types are generated based at least in part on analysis of real-time event traffic. The real-time event traffic comprises a subset of the plurality of events published by the one or more event sources to the event platform over a designated time period. The designated time period may vary as desired so as to appropriately capture real-time event traffic in a given application area. For example, the designated time period in some embodiments may be a 24-hour time period. The designated time period may be measured relative to a current time, where the designated time period represents a sliding or rolling time window such that the dynamic event tags are continually updated for events published in the last 24 hours. In other embodiments, however, the designated time period need not be associated with a sliding or rolling time window. For example, the dynamic event tags may be generated once a day (or once every other day, once a week, twice a day, etc.), with the designated time period covering event traffic from the previous day (e.g., the dynamic event tags may be generated at 9:00 AM on a Tuesday, where the designated time period covers all events published on the previous day, Monday).

Generating the dynamic tags in step 202 captures linguistic context of the real-time event traffic by applying natural language processing with topic modeling to text in the event metadata for the subset of the plurality of events published by the one or more event sources to the event platform over the designated time period. In some embodiments, step 202 includes, for a given one of the event types, creating a token dataset comprising occurrence frequencies for tokens representing at least a subset of a plurality of words in the event metadata for one or more events in the subset of the plurality of events associated with the given event type that are published by the one or more event sources to the event platform over the designated time period. Creating the token dataset may comprise splitting text of the event metadata for the one or more events in the subset of the plurality of events associated with the given event type into one or more sentences, splitting the one or more sentences into the plurality of words, lemmatizing the plurality of words, stemming the plurality of words, and extracting ones of the stemmed words that are nouns and verbs to form the subset of the plurality of words.

Step 202 may further include performing topic modeling on the token dataset. The topic modeling may include creating a bag of words (BOW) model for the tokens in the token dataset, filtering the tokens in the token dataset, and applying a latent Dirichlet allocation (LDA) algorithm to the BOW model with the filtered tokens to identify topics for respective ones of the events in the subset of the plurality of events published by the one or more event sources to the event platform over the designated time period. Filtering the tokens in the token dataset may comprise: removing tokens that occur in less than a first threshold number of event instances in the subset of the plurality of events published by the one or more event sources to the event platform over the designated time period; removing tokens that occur in more than a second threshold number of event instances in the subset of the plurality of events published by the one or more event sources to the event platform over the designated time period; and keeping a third threshold number of most frequent remaining tokens.

Figure 2:
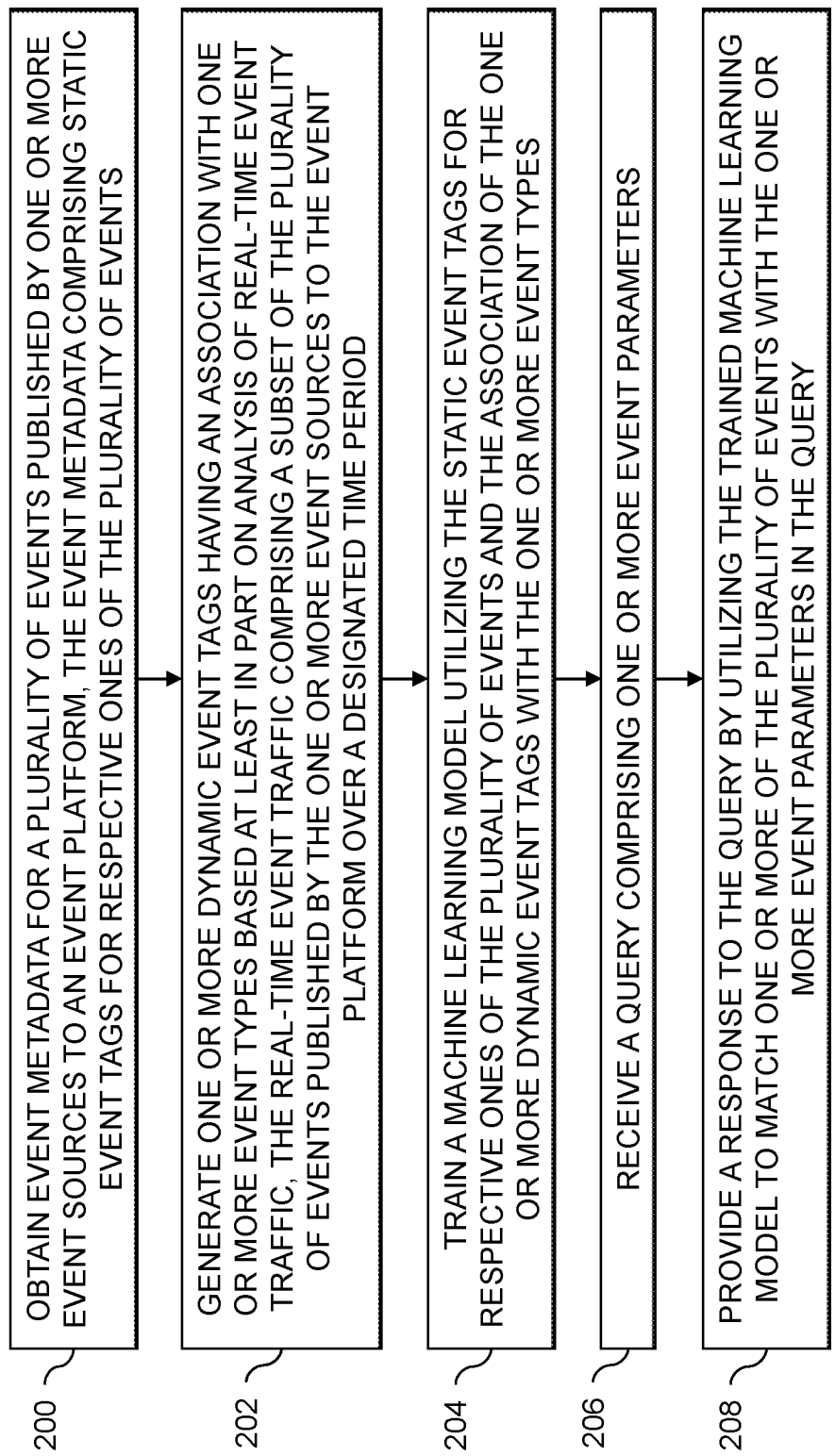
FIG. 2 is a flow diagram of an exemplary process for event searching utilizing a machine learning model trained using dynamically-generated event tags in an illustrative embodiment.

The FIG. 2 process continues with step 204, training a machine learning model utilizing the static event tags for respective ones of the plurality of events and the association of the one or more dynamic event tags with the one or more event types. The machine learning model may comprise a convolutional neural network (CNN) model or other type of deep learning model (e.g., a recurrent neural network (RNN) model, a fully connected neural network model, etc.). As discussed above, in some embodiments the designated time period which defines the real-time event traffic may comprise a sliding or rolling time window. In such embodiments, steps 202 and 204 may be repeated responsive to expiration of the sliding or rolling time window (e.g., to update the dynamic tags and re-train the machine learning model based on new real-time event traffic). In embodiments where the designated time period is not a sliding or rolling time window, steps 202 and 204 may be repeated as desired (e.g., once a day, twice a day, once every other day, responsive to user input, etc.) to update the dynamic tags and re-train the model to capture new real-time event traffic.

In step 206, a query comprising one or more event parameters is received. In step 208, a response to the query is provided, where the response is generated by utilizing the trained machine learning model to match one or more of the plurality of events with the one or more event parameters in the query. Advantageously, the machine learning model is trained using both the static and the dynamic event tags, thus improving search or query results with predictive application event metadata enrichment. In some embodiments, the one or more event sources comprise one or more applications running on at least one of physical and virtual computing resources of an IT infrastructure. The static event tags and the dynamic event tags are stored in an event register maintained by the event platform, where the event register exposes one or more APIs for receiving the query and providing the response to the query.

An event platform may provide mechanisms for publishing and subscribing to events among a disparate set of applications. FIGS. 3A-3C illustrate an event platform 302 that is enhanced with functionality for automated metadata enrichment of published events facilitating improved event searches. FIG. 3A shows the event platform 302, where a set of event sources 301 (e.g., cloud applications 301-1, custom applications 301-2, third-party applications 301-3, etc.) publish events to the event platform 302 via a source interface 311. FIG. 3A also shows a set of event targets 303 (e.g., cloud applications 303-1, custom applications 303-2, third-party applications 303-3) that subscribe to events published to the event platform 302 by the event sources 303-1 via the target interface 313. In the FIG. 3A context, the distinction between "custom" applications 303-2 and "third-party" applications 303-3 relates to an organization, enterprise or other entity operating the event platform 302. The custom applications 303-2 refer to applications that are developed in-house by the same organization that operates the event platform 302, whereas third-party applications refer to applications that are external software developed by another organization and are used by the organization operating the event platform 302. At least a portion of the custom applications 303-2 and third-party applications 303-3 may be cloud-hosted. The source interface 311 and target interface 313 of the event platform 302 may be implemented using one or more APIs accessible to the event sources 301 and event targets 303.

It should be appreciated that a particular application may be both one of the event sources 301 and one of the event targets 303 in different contexts. For example, a given cloud application may function as one of the cloud applications 301-1 to publish events to the event platform 302 via the source interface 311, and may also function as one of the cloud applications 303-1 to subscribe to events via the target interface 313.

As shown in FIG. 3A, the event platform 302 implements event processing module 312 via a set of functional modules including a message broker module 321, a mediation module 323, a transformation module 325, a queuing and scheduling module 327 and a complex event processing module 329. The message broker module 321 provides functionality for processing events from event sources 301 received via the source interface 311 and offers events to the subscribing event targets 303 via the target interface 313. More generally, the message broker module 321 provides functionality for receiving an event from one system (e.g., an event source or event target) and handing it off to another system (e.g., another event source or event target).

The mediation module 323 is configured to provide orchestration functionality for events (e.g., receiving events from an event queue and generating additional events for processing the received event). More generally, the mediation module 322 provides functionality for receiving an event from one system and handing it over to another system in the form of a transaction, where the process is not considered complete until the destination confirms its successful completion. An example of such a process is a bank wire transfer.

The transformation module 325 is configured to transform events in accordance with various policies. More generally, the transformation module 325 provides functionality for receiving an event from one system, transforming the event into a format which another system can understand, and then handing it over to the other system (and vice-versa).

The queuing and scheduling module 327 may be used by other ones of the modules (e.g., message broker module 321, mediation module 325, complex event processing module 329) for managing event queues and scheduling events. As noted above, for example, the mediation module 323 may pull events from one or more event queues and process such events which may involve scheduling additional events. More generally, the queuing and scheduling module 327 provides functionality for receiving an event from one system which produces events at a different rate (e.g., a faster rate than another system), temporarily queues the events in a persistent data store, and hands the events over to the other system in the same schedule in which they were received. Such functionality bridges the gaps between a fast event producer system and a relatively slower destination system.

The complex event processing module 329 is configured to provide functionality for combining and processing groups of events. More generally, the complex event processing module 329 provides functionality for aggregating different events, and for identifying and analyzing cause-effect relationships to detect patterns among different events in real-time. Such functionality is useful for providing proactive analytics and remediations.

The event platform 302 accesses a database or other data store 308 providing an event register structure 380 where users of computing devices 304 can search for various events based on tags and search criteria. The search functionality and accuracy depend on event metadata 382 provided by the publishing event source 301 or a user associated with the publishing event source 301. This mechanism, however, does not take into account the dynamic, ever-changing linguistic meaningful context of event traffic flowing through the event platform 302. Instead, this mechanism relies on full-text search and manually provided or entered static metadata tags, which may not provide accurate search results in some cases.

The event platform 302 provides functionality for predictive event tagging utilizing an automated event tagging and enrichment module 314 (shown in FIG. 3B) that enables enhanced contextual event searching utilizing a predictive event search module 316 (shown in FIG. 3C).

To do so, embodiments analyze both static event metadata and dynamic contents of real-time application event traffic through the event platform. This functionality is provided, in some embodiments, utilizing natural language processing (NLP) and topic modeling for understanding the linguistic context of event traffic to generate tags that are not provided as part of publishing an event to the event platform. Using NLP and topic modeling, the event platform is able to automatically assign computer-generated tags to events that are published to the event platform. The event platform further utilizes machine learning, such as a convolutional neural network (CNN) architecture, to implement a reinforcement learning approach for training a model used to predict events for future user search queries.

FIG. 3B illustrates aspects of automated event tagging based on NLP and topic modeling via the automated event tagging and enrichment module 314, which comprises an event classification module 341, a static event content parsing module 343, a dynamic event content parsing module 345, and an event tagging module 347. The event classification module 341 performs classification of events based on static event contents that are received from the event source as part of publishing events to the event platform 302 (e.g., as part of event registration). Such static event contents may be provided using the static event content parsing module 343.

The dynamic event content parsing module 345 is configured to automatically generate metadata tags based on dynamic event content using NLP. The dynamic event content parsing module 345 analyzes event traffic at runtime, and parses through available instance data (e.g., source application, event name, event description, payload schema, payload content type, etc.) to suggest more meaningful "tags" for events using NLP and topic modeling with an LDA algorithm.

The event tagging module 347 is configured to consolidate tags provided by the static event content parsing module 343 and dynamic event content parsing module 345, and to update a set of tags (e.g., a list of discovered tags) for the events in the event register 380.

The NLP and topic modeling functionality of the dynamic event content parsing module 345 will now be further described. Such functionality may include various data pre-processing, where the dynamic event content parsing module 345 will: (i) read all event instances for a designated time period (e.g., the past day) to form the dataset used for processing; (ii) split text into sentences, and sentences into words; (iii) lemmatize the words; (iv) stem the words and reduce them to their root form; and (v) extract nouns and verbs alone. After data pre-processing, topic modeling is performed. During topic modeling, the dynamic event content parsing module 345 may: (i) create a BOW model; (ii) filter tokens that meet one or more conditions or criteria (e.g., appears in less than "x" event instances, appears in more than "y" event instances); (iii) keep a threshold number of tokens (e.g., the first "z" most frequent tokens); and (iv) apply the LDA to the BOW model to identify topics that demonstrate or dominate each event.

The event tagging module 347 identifies the most relevant keywords found in the overall sample dataset. These keywords or tags may then be associated with different event types for use in automatically generating and assigning tags to the events in the event register 380.

Each event type and its associated tags (document) has a certain ratio of topics that acts as its "DNA" and also the associated tags. In this context, a "document" refers to a chunk of text which is processed as an entity in NLP. Each document, for example, may be an event instance. The event types and associated tags are used to train a machine learning model implemented by machine learning module 363. FIG. 3C illustrates how this information, which may be stored in the event register 380 by the event tagging module 347 following the above-described NLP, is used by the predictive event searching module 316. The dynamic event tags form part of a training and sample data set, or more generally training data 361, that is fed to the machine learning module 363 that implements a machine learning model such as a CNN model, to train the machine learning model in a frequent cyclic manner. Each event type and its associated corpus of tags is passed to the CNN model (or other type of machine learning model implemented by the machine learning module 363), which may be viewed as forming the backbone of predictive model 365. The predictive model 365 receives queries (e.g., from users associated with computing devices 304) and returns search responses with matching events using the CNN machine learning model provided by the machine learning module 363.

As discussed above, a set of events are published to the event platform 302. Each event is associated with a corpus of tags, which may be manually added or automatically and dynamically generated as described herein. A corpus of meaningful tags associated with an event provides the event with a linguistic signature or meaning, in terms of what the event is associated with. This structure is represented in a vector format (e.g., of a standard size as selected by a system administrator or other authorized user), with the resulting vectors being input to the machine learning model (e.g., the CNN machine learning model provided by the machine learning module 363). The CNN machine learning model is trained on a test set of sample event vectors, and outputs results along with the probability of each sample event vector belonging to a certain class of events. This is used to accurately relate user queries with the right set of matching events based on its associated tags. Depending on the resolution of the visual vector representation of a particular event and its corpus of tags, a 3-dimensional matrix of numbers may be built (e.g., a 480×480×3 array of numbers, where 3 is an RGB value).

Each tag, whether manually added or dynamically generated as described herein, will have a filter defined in the CNN model. If, at a given point in time, there are 100 distinct tags associated with all events, the CNN model will have 100 filters. By sliding the filters over input event vectors and building activation maps, the CNN model predicts the probability of a certain tag in the input event vectors. For a user search query, the system will parse through the query to extract meaningful text and the CNN model will predict all events that have those tags. All the matching events which have a high probability (e.g., as defined by some threshold) of having a tag (corresponding to the meaningful text of the user search query) will be returned to the user as a response.

FIG. 4 illustrates operation of the system of FIGS. 3A-3C with two examples. In FIG. 4, a first user associated with a first computing device (e.g., an application architect 304-1) is looking for events triggered in a first application that are related to order submission in the first application. The application architect 304-1 generates a query 401-1 that is submitted to the event platform 302 (e.g., to the predictive event searching module 316 thereof) with metadata criteria such as "App1, Order Submission, Order Receipt." The predictive event searching module 316 of the event platform 302 uses the trained machine learning model to filter out events based on the search criteria matching event tag classifications, and returns the list of matching events in a response 402-1 to the application architect 304-1.

In FIG. 4, a second user associated with a second computing device (e.g., application developer 304-2) is looking for events emanating from a second application so as to build logic for tracking payment processing in real-time (e.g., rather than waiting for a final response from the second application). To do so, the application developer 304-2 generates a query 401-2 that is submitted to the event platform 302 (e.g., to the predictive event searching module 316 thereof) with metadata such as "Payment, IPayments, Credit Card Processing." The predictive event searching module 316 of the event platform 302 utilizes the trained machine learning model to filter out events based on the search criteria matching the event tag classifications, and returns the list of matching events in a response 402-2 to the application developer 304-2.

The event platforms (e.g., 102, 302) described herein provide techniques for enhancing user event search accuracy in a wide variety of application event environments. Advantageously, the event platforms described herein perform predictive application event tagging using NLP (e.g., topic modelling) techniques that analyze static event content as well as dynamic content from real-time event traffic flow. Such predictive application event tagging is used to train a machine learning model (e.g., a CNN model) for event classification. The trained machine learning model is used to respond to event queries, providing improved event response results. The combined approach of NLP and machine learning modeling provides a novel approach for predictive event search responses in event platforms.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for event searching utilizing a machine learning model trained using dynamically-generated event tags will now be described in greater detail with reference to FIGS. 5 and 6. Although described in the context of system 100, these platforms may also be used to implement at least portions of other information processing systems in other embodiments.

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for event searching utilizing a machine learning model trained using dynamically-generated event tags as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, event platforms, event sources, event targets, event metadata, machine learning algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      obtaining event metadata for a plurality of events published by one or more event sources to an event platform, the event metadata comprising static event tags for respective ones of the plurality of events;
      generating one or more dynamic event tags having an association with one or more event types based at least in part on analysis of real-time event traffic, the real-time event traffic comprising a subset of the plurality of events published by the one or more event sources to the event platform over a designated time period;
      training a machine learning model utilizing the static event tags for respective ones of the plurality of events and the association of the one or more dynamic event tags with the one or more event types;
      receiving a query comprising one or more event parameters; and
      providing a response to the query by utilizing the trained machine learning model to match one or more of the plurality of events with the one or more event parameters in the query.

2. The apparatus of claim 1 wherein at least one static event tag for a given one of the plurality of events is assigned by a given one of the event sources in conjunction with publishing the given event to the event platform.

3. The apparatus of claim 1 wherein the event metadata for a given one of the plurality of events further comprises a source application, an event name and an event description.

4. The apparatus of claim 1 wherein the event metadata for a given one of the plurality of events further comprises a payload schema and a payload content type.

5. The apparatus of claim 1 wherein the designated time period comprises a sliding time window, and wherein the at least one processing device is configured to repeat the steps of generating the one or more dynamic event tags and training the machine learning model responsive to expiration of the sliding time window.

6. The apparatus of claim 1 wherein generating the one or more dynamic event tags captures linguistic context of the real-time event traffic by applying natural language processing with topic modeling to text in the event metadata for the subset of the plurality of events published by the one or more event sources to the event platform over the designated time period.

7. The apparatus of claim 1 wherein generating the one or more dynamic event tags comprises, for a given one of the one or more event types, creating a token dataset comprising occurrence frequencies for tokens representing at least a subset of a plurality of words in the event metadata for one or more events in the subset of the plurality of events associated with the given event type that are published by the one or more event sources to the event platform over the designated time period.

8. The apparatus of claim 7 wherein creating the token dataset comprises:
splitting text of the event metadata for the one or more events in the subset of the plurality of events associated with the given event type into one or more sentences;
splitting the one or more sentences into the plurality of words;
lemmatizing the plurality of words;
stemming the plurality of words; and
extracting ones of the stemmed words that are nouns and verbs to form the subset of the plurality of words.

9. The apparatus of claim 7 wherein generating the one or more dynamic event tags comprises, for the given event type, performing topic modeling on the token dataset.

10. The apparatus of claim 9 wherein performing topic modeling on the token dataset comprises:
creating a bag of words model for the tokens in the token dataset;
filtering the tokens in the token dataset; and
applying a latent Dirichlet allocation algorithm to the bag of words model with the filtered tokens to identify topics for respective ones of the events in the subset of the plurality of events published by the one or more event sources to the event platform over the designated time period.

11. The apparatus of claim 10 wherein filtering the tokens in the token dataset comprises:
removing tokens that occur in less than a first threshold number of event instances in the subset of the plurality of events published by the one or more event sources to the event platform over the designated time period;
removing tokens that occur in more than a second threshold number of event instances in the subset of the plurality of events published by the one or more event sources to the event platform over the designated time period; and
keeping a third threshold number of most frequent remaining tokens.

12. The apparatus of claim 1 wherein the machine learning model comprises a convolutional neural network model.

13. The apparatus of claim 1 wherein the one or more event sources comprise one or more applications running on at least one of physical and virtual computing resources of information technology infrastructure.

14. The apparatus of claim 1 wherein the static event tags and the dynamic event tags are stored in an event register maintained by the event platform, the event register exposing one or more application programming interfaces for receiving the query and providing the response to the query.

15. A computer program product comprising a non-transitory processor-readable storage medium having stored therein program code of one or more software programs, wherein the program code when executed by at least one processing device causes the at least one processing device to perform steps of:
obtaining event metadata for a plurality of events published by one or more event sources to an event platform, the event metadata comprising static event tags for respective ones of the plurality of events;
generating one or more dynamic event tags having an association with one or more event types based at least in part on analysis of real-time event traffic, the real-time event traffic comprising a subset of the plurality of events published by the one or more event sources to the event platform over a designated time period;
training a machine learning model utilizing the static event tags for respective ones of the plurality of events and the association of the one or more dynamic event tags with the one or more event types;
receiving a query comprising one or more event parameters; and
providing a response to the query by utilizing the trained machine learning model to match one or more of the plurality of events with the one or more event parameters in the query.

16. The computer program product of claim 15 wherein generating the one or more dynamic event tags captures linguistic context of the real-time event traffic by applying natural language processing with topic modeling to text in the event metadata for the subset of the plurality of events published by the one or more event sources to the event platform over the designated time period.

17. The computer program product of claim 15 wherein the static event tags and the dynamic event tags are stored in an event register maintained by the event platform, the event register exposing one or more application programming interfaces for receiving the query and providing the response to the query.

18. A method comprising steps of:
obtaining event metadata for a plurality of events published by one or more event sources to an event platform, the event metadata comprising static event tags for respective ones of the plurality of events;
generating one or more dynamic event tags having an association with one or more event types based at least in part on analysis of real-time event traffic, the real-time event traffic comprising a subset of the plurality of events published by the one or more event sources to the event platform over a designated time period;
training a machine learning model utilizing the static event tags for respective ones of the plurality of events and the association of the one or more dynamic event tags with the one or more event types;
receiving a query comprising one or more event parameters; and
providing a response to the query by utilizing the trained machine learning model to match one or more of the plurality of events with the one or more event parameters in the query;
wherein the method is performed by at least one processing device comprising a processor coupled to a memory.

19. The method of claim 18 wherein generating the one or more dynamic event tags captures linguistic context of the real-time event traffic by applying natural language processing with topic modeling to text in the event metadata for the subset of the plurality of events published by the one or more event sources to the event platform over the designated time period.

20. The method of claim 18 wherein the static event tags and the dynamic event tags are stored in an event register maintained by the event platform, the event register exposing one or more application programming interfaces for receiving the query and providing the response to the query.

* * * * *